(12) United States Patent
McCann et al.

(10) Patent No.: US 7,502,611 B2
(45) Date of Patent: Mar. 10, 2009

(54) METHODS AND SYSTEMS FOR TRIGGERLESS PREPAID SMS SCREENING AND ACCOUNTING IN A SIGNALING MESSAGE ROUTING NODE

(75) Inventors: Thomas Matthew McCann, Morrisville, NC (US); Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/527,975

(22) Filed: Sep. 27, 2006

(65) Prior Publication Data

US 2007/0021101 A1    Jan. 25, 2007

Related U.S. Application Data

(62) Division of application No. 10/218,402, filed on Aug. 14, 2002, now Pat. No. 7,181,194.

(60) Provisional application No. 60/312,154, filed on Aug. 14, 2001.

(51) Int. Cl.
*H04Q 7/20* (2006.01)
*H04M 3/00* (2006.01)

(52) U.S. Cl. .................................. 455/419; 455/456.1

(58) Field of Classification Search .................. 455/408, 455/419, 456.1
See application file for complete search history.

(56) References Cited

U.S. PATENT DOCUMENTS

| 5,903,726 | A | 5/1999 | Donovan et al. |
| 5,915,222 | A | 6/1999 | Olsson et al. |
| 5,995,822 | A | 11/1999 | Smith et al. |
| 6,188,752 | B1 | 2/2001 | Lesley |
| 6,393,269 | B1 | 5/2002 | Hartmaier et al. |

(Continued)

FOREIGN PATENT DOCUMENTS

EP    1 107 617 A2    6/2001

(Continued)

OTHER PUBLICATIONS

Supplementary European Search Report corresponding to European Patent Application No. 02794890.0-2412 (Dec. 19, 2007).

(Continued)

*Primary Examiner*—William D Cumming
(74) *Attorney, Agent, or Firm*—Jenkins, Wilson, Taylor & Hunt, P.A.

(57) ABSTRACT

Methods and systems for triggerless prepaid short message service (SMS) screening and accounting in a signaling message routing node are disclosed. According to one aspect, the subject matter herein includes a prepaid SMS screening and accounting module. The prepaid SMS screening and accounting module includes a prepaid SMS screening function, where the function is an application program for receiving SMS messages and determining whether the SMS messages are associated with prepaid subscribers. The prepaid SMS screening and accounting module further includes a prepaid SMS accounting function, where the function is an application program co-located with the prepaid SMS screening function for determining, for the prepaid SMS messages associated with prepaid subscribers, whether the subscribers have sufficient credit for delivery of the SMS messages, and, in response, for sending the SMS messages to their intended destinations. At least one processor executes the prepaid SMS screening and accounting functions.

9 Claims, 6 Drawing Sheets

U.S. PATENT DOCUMENTS

| | | |
|---|---|---|
| 6,453,158 B2 | 9/2002 | Donovan et al. |
| 6,480,588 B1 | 11/2002 | Donovan |
| 6,496,690 B1 | 12/2002 | Cobo et al. |
| 6,516,194 B2 | 2/2003 | Hanson |
| 6,535,727 B1 | 3/2003 | Abbasi et al. |
| 6,584,183 B2 | 6/2003 | Manto |
| 6,633,764 B1 | 10/2003 | Garcia |
| 6,801,781 B1 | 10/2004 | Provost et al. |
| 2002/0029189 A1 | 3/2002 | Titus et al. |
| 2002/0111153 A1 | 8/2002 | Hartmaier et al. |
| 2002/0150079 A1 | 10/2002 | Zabawskyj et al. |
| 2003/0203740 A1 | 10/2003 | Bahi et al. |
| 2004/0233840 A1 | 11/2004 | Bye |

FOREIGN PATENT DOCUMENTS

| | | |
|---|---|---|
| GB | 2382267 | 5/2003 |
| WO | WO 01/22761 | 3/2001 |
| WO | WO 01/63883 A2 | 8/2001 |
| WO | WO 03/017697 | 2/2003 |

OTHER PUBLICATIONS

Official Action for European Patent Application No. 02 794 890.0-2412 (Mar. 18, 2008).

"Description of the SMS Prepaid Relay function implemented in the SRF equipment," edition 0.1, unpublished, dated Jul. 2001.

METHODS AND SYSTEMS FOR TRIGGERLESS PREPAID SMS SCREENING AND ACCOUNTING IN A SIGNALING MESSAGE ROUTING NODE

RELATED APPLICATIONS

This application is a divisional of U.S. patent application Ser. No. 10/218,402, filed Aug. 14, 2002, now U.S. Pat. No. 7,181,194 which claims the benefit of U.S. Provisional Patent Application Ser. No. 60/312,154, filed Aug. 14, 2001, the disclosures of each of which are incorporated herein by reference in their entireties.

TECHNICAL FIELD

The present invention relates to methods and systems for providing triggerless prepaid SMS screening and accounting services. More particularly, the present invention relates to methods and systems for providing triggerless prepaid SMS screening and accounting services in a prepaid SMS screening, accounting, and routing node.

BACKGROUND ART

In some mobile communications networks, mobile subscribers prepay a network operator for SMS message service. For example, some mobile subscribers may prepay for the right to send 100 SMS messages in a given month. Other mobile subscribers may not prepay for SMS message service and instead pay after the fact for the amount of SMS messages sent or received within a given month.

Currently, network operators generate intelligent network (IN) queries to an accounting database for SMS messages originating from both prepaid and postpaid mobile subscribers. For prepaid mobile subscribers, the lookup in the database determines whether the mobile subscriber has sufficient credit for sending an SMS message. If the mobile subscriber has sufficient credit, the database returns a response and the SMS message is delivered to its intended recipient. For postpaid mobile subscribers, the lookup in the accounting database is wasteful, since no prepaid SMS information exists in the database for postpaid subscribers. In this case, the database returns a response indicating that the SMS message should be delivered to its intended recipient.

Using IN queries to perform prepaid SMS accounting functions increases network traffic and delays SMS message delivery. For example, the sending MSC must formulate the IN query and suspend delivery of the SMS message until the response arrives. Formulating IN queries to the accounting database for both prepaid and postpaid subscribers further increases network traffic, SMS message delivery time, and the number of hits to the prepaid SMS accounting database.

Another problem with SMS service relates to number portability. When a mobile subscriber changes service providers and decides to keep his or her mobile telephone number, the telephone number is ported from the original network to the new network. However, the originating mobile subscriber may still have access to the SMSC in the original network because networks typically do not screen SMS messages originated by ported subscribers.

One proposed solution to these problems associated with SMS service is to locate a signaling relay function in the network between a mobile switching center and a pre-paid SMS server. FIG. 1 illustrates this solution. In FIG. 1, a signaling relay function (SRF) 100 and a prepaid SMS server 102 are located between a mobile switching center (MSC) 104 and a short message service center 106 in a mobile communications network. In this proposed solution, in step 1, MSC 104 originates a mobile-originated forward short message (MO FSM) message to a signaling relay function 100. SRF 100 identifies the operation code of the MO FSM message and analyses the MSISDN of the calling subscriber. In this case, the subscriber is a prepaid SMS subscriber (with information registered in the SRF database), and SRF 100 relays the MO FSM message to a prepaid SMS server 102 (step 2).

In step 3, prepaid SMS server 102 authorises the calling subscriber to send an SMS message. Prepaid SMS server 102 opens a new TCAP dialog towards SMSC 106 by sending a MO FSM message to SRF 102 with SMSC 106 as final destination.

In step 4, SRF 100 relays the MO FSM message to SMSC 106. In step 5, SMSC 106 acknowledges the MO FSM message by sending a MO FSM Ack message directly to prepaid SMS server 102. In step 6, prepaid SMS server 102 acknowledges the MO FSM message received in the step 2 by sending a FSM MO Ack to SRF 100 with MSC 104 as final destination. In step 7, SRF 100 relays the MO FSM Ack message to MSC 104.

As illustrated in the solution in FIG. 1, locating a signalling relay function and a separate prepaid SMS server in the network results in multiple MAP messages in the network. For example, in FIG. 1, the MAP dialog between SRF and the prepaid SMS server results in three additional MAP messages (the MAP MO FSM messages in steps 2 and 3 and the MAP MO FSM ack message in step 6) for every SMS message sent. In light of the expected increase in SMS traffic in the networks, such additional message traffic is undesirable.

Another problem with prepaid SMS solutions, such as that illustrated in FIG. 1, relates to prepaid roaming. When an SMS subscriber is roaming, SMS messages originated by the subscriber must travel to one of the subscriber's home network SMSCs to be delivered to the intended destination. For IN-based solutions, the MSC in the visited network must query the prepaid SMS accounting database to determine whether the subscriber has sufficient prepaid SMS credit to send the message. The home network must depend on the visited network to make this determination. This is undesirable because it requires the operator of the home network to rely on the visited network for prepaid SMS screening and accounting. Such a solution is not practical because a prepaid SMS service provider would be required to have prepaid SMS accounting agreements with all networks in which any of its subscribers desires to roam. Thus, there exists a need for improved methods and systems for providing screening service for prepaid SMS messages.

DISCLOSURE OF THE INVENTION

The present invention includes improved methods and systems for prepaid SMS screening and accounting that reduce the number of signaling messages required for providing prepaid SMS service and that simplify prepaid SMS roaming. According to one aspect of the invention, prepaid SMS screening, accounting, and routing functions are consolidated in a single network node. A prepaid SMS screening, accounting, and routing node determines whether received SMS messages originate from prepaid or postpaid subscribers and performs prepaid SMS accounting functions for those messages that require prepaid service. The prepaid SMS screening, accounting, and routing node may be an SS7 signal transfer point or an SS7/IP gateway. In response to determining that the SMS messages originate from a prepaid subscriber, the prepaid SMS screening, accounting, and routing node performs a lookup in a local prepaid SMS accounting database. If the prepaid SMS screening, accounting, and routing node determines that a prepaid SMS subscriber does not have sufficient credit for sending an SMS message, the prepaid SMS screening, accounting, and routing node forwards a message to an originating node indicating non-delivery of the SMS message. The prepaid SMS screening, accounting, and routing node may also send a new SMS message to the originating subscriber indicating non-delivery of the SMS message. In response to determining that the mobile subscriber has sufficient credit, the prepaid SMS screening, accounting, and routing node forwards the SMS message to its intended destination.

Because the prepaid SMS screening, accounting, and routing node performs a lookup in a screening database to screen SMS messages that are not originated by prepaid subscribers, the load on the accounting database is reduced. In addition, since the accounting database is located internal to the prepaid SMS screening, accounting, and routing node, network traffic is also reduced.

According to another aspect of the invention, the prepaid SMS screening, routing, and accounting node determines whether to allow access to an SMSC. When an SMS message is received, a database lookup is performed to determine whether the SMS message originates from a mobile subscriber of a particular network. If the SMS message did not originate from a mobile subscriber of the particular network, a lookup is performed to determine whether the SMSC ID in the message matches one of the SMSC IDs of the particular network. If the SMSC ID matches, then the message is from a mobile subscriber of another network who is trying to access an SMSC of this network. In this situation, the mobile subscriber is not permitted to access the SMSC.

The prepaid SMS screening, accounting, and routing node is capable of screening both mobile-originated and mobile-terminated prepaid SMS messages. In addition, the prepaid SMS screening, accounting, and routing node is capable of triggerlessly intercepting SMS messages that are not addressed to the prepaid SMS screening, accounting, and routing node.

Accordingly, it is an object of the invention to provide methods and systems for improved prepaid SMS screening and accounting service.

It is another object of the invention to provide methods and systems for prepaid SMS screening and accounting that enable prepaid SMS roaming.

It is yet another object of the invention to reduce the number of signaling messages required for prepaid SMS service.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

Figure 2:
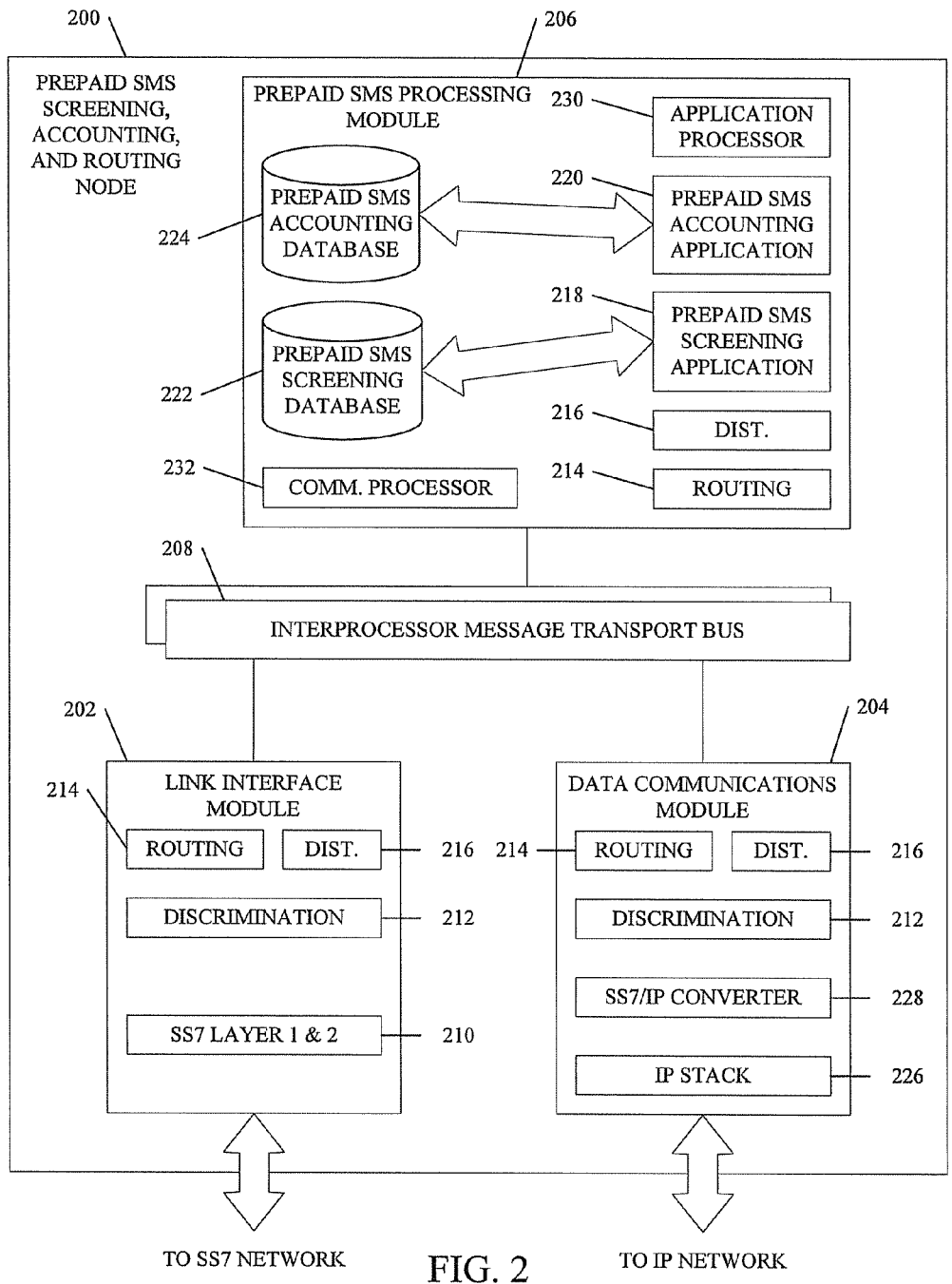
FIG. 2 is a block diagram of a prepaid SMS screening, accounting, and routing node according to an embodiment of the present invention.

In one embodiment of the invention, both the prepaid SMS screening database and the prepaid SMS accounting database reside within a routing node, such as a signal transfer point or SS7/IP gateway. FIG. 2 illustrates a prepaid SMS screening, accounting, and routing node that includes SS7 signal transfer point functionality, SS7/IP gateway functionality, prepaid SMS screening functionality, and prepaid SMS accounting functionality. In FIG. 2, prepaid SMS screening, accounting, and routing node 200 includes a link interface module 202, a data communications 204 module, and a prepaid SMS processing module 206 connected via an interprocessor message transport bus 208. Each of the modules may include one or more processing elements and associated control and buffer memory for processing received SMS messages. In one embodiment, each processing module includes an application processor 230 for executing application programs, such as prepaid SMS processing programs and routing programs, and a communications processor 232 for sending and receiving messages over bus 208.

In the illustrated example, link interface module 202 includes SS7 layer 1 and 2 applications 210 for performing SS7 layer 1 and 2 functions for SS7 messages. Such functions may include providing a physical layer interface, error detection, error correction, and packet sequencing. A discrimination application 212 analyzes destination point codes in received SS7 messages to determine whether the messages are addressed to prepaid SMS screening, accounting, and routing node 200 or to another node. A routing application 214 routes messages that are addressed to prepaid SMS screening, accounting, and routing node 200. A distribution application 216 distributes messages that are addressed to prepaid SMS screening, accounting, and routing node 200 for further processing.

In order to intercept SMS messages that are not addressed to prepaid SMS screening, accounting, and routing node 200, for mobile-originated SMS messages, discrimination application 212 may also have a list of point codes for all SMSCs in a particular network. In response to receiving a message that is MTP-addressed to one of the SMSCs, discrimination application 212 may forward the message to prepaid SMS processing module 206 for further processing. For mobile-terminated SMS messages, discrimination application 212 may identify messages that originate from an SMSC in a list of SMSCs. Thus, one feature of the present invention is the capability to intercept, screen, and perform accounting for prepaid SMS messages without requiring that the messages be addressed to a specialized processing node. This feature allows prepaid SMS screening, accounting, and routing node 200 to be introduced into a network without requiring MSCs to be reconfigured to address prepaid SMS message to prepaid SMS screening, accounting, and routing node 200.

Prepaid SMS processing module 206 includes various applications and data structures for providing prepaid SMS screening and accounting functions. In the illustrated example, the functions and database include a prepaid SMS screening application 218, a prepaid SMS accounting application 220, a prepaid SMS screening database 222, and a prepaid SMS accounting database 224. Prepaid SMS processing module 206 may also include routing and distribution functions 214 and 216 similar to those described above with regard to LIM 202.

Prepaid SMS screening application 218 determines whether received SMS messages originate from prepaid SMS subscribers or postpaid SMS subscribers by comparing parameter(s) in received SMS messages to parameters stored in prepaid SMS screening database 222. Messages from prepaid SMS subscribers are forwarded to prepaid SMS accounting application 220. SMS messages received from post-paid subscribers are forwarded to their intended destinations. Prepaid SMS screening application 218 may also screen SMS messages to determine whether the messages originate from mobile subscribers who have been ported out of a particular service provider's network. In response to determining that a mobile subscriber has been ported from the network, prepaid SMS screening application 218 may prevent the mobile subscriber from accessing the SMSC in the particular network.

Prepaid SMS accounting application 220 accesses accounting data in prepaid SMS accounting database 224 to determine whether the originating prepaid subscriber has sufficient credit in his or her account to send the prepaid SMS message. The cost for sending the particular SMS message may be determined based on the destination, time of day, size of the message, etc. In response to determining that the subscriber has sufficient credit to send the SMS message, prepaid SMS accounting application 220 may debit the subscriber's account and forward the message to its intended destination. In response to determining that the prepaid subscriber lacks sufficient credit to send the message, prepaid SMS accounting application 220 may discard the message. In addition, prepaid SMS accounting application 220 may send an error message to the originating node indicating non-delivery of the SMS message and/or an SMS message to the originating subscriber indicating that the message did not go through. For example, the SMS message to the mobile subscriber may indicate that insufficient credit exists in the subscriber's account to send the SMS message.

Although the embodiment illustrated in FIG. 2 includes separate prepaid SMS screening and accounting databases, the present invention is not limited to such an embodiment. In an alternate embodiment, the prepaid SMS screening and accounting databases may be combined into a single database without departing from the scope of the invention.

Data communications module 204 sends and receives SS7 messages over an IP network. In the example, data communications module 204 includes an IP protocol stack 226 for sending and receiving messages over an IP network, an SS7/IP converter 228 for converting between SS7 and IP protocol stacks, a discrimination application 212, a routing application 214, and a distribution application 216. The discrimination, distribution, and routing applications perform the same functions as those described with respect to the link interface module. Hence, a description thereof will not be repeated herein.

Although FIG. 2 illustrates the prepaid SMS screening and accounting functions as being resident on the same processing module or card within a signaling gateway routing node, the present invention is not limited to such an embodiment. For example, in an alternative embodiment, either or both functions may be located external to the routing node. In such an embodiment, the external SMS screening or accounting processors are preferably coupled to and accessible by the routing node such that the combined elements appear as single node to other network elements. In one example, the prepaid SMS screening and/or accounting functions may be located on a general purpose computing platform coupled to routing node 200 via a local area network.

Figure 3:
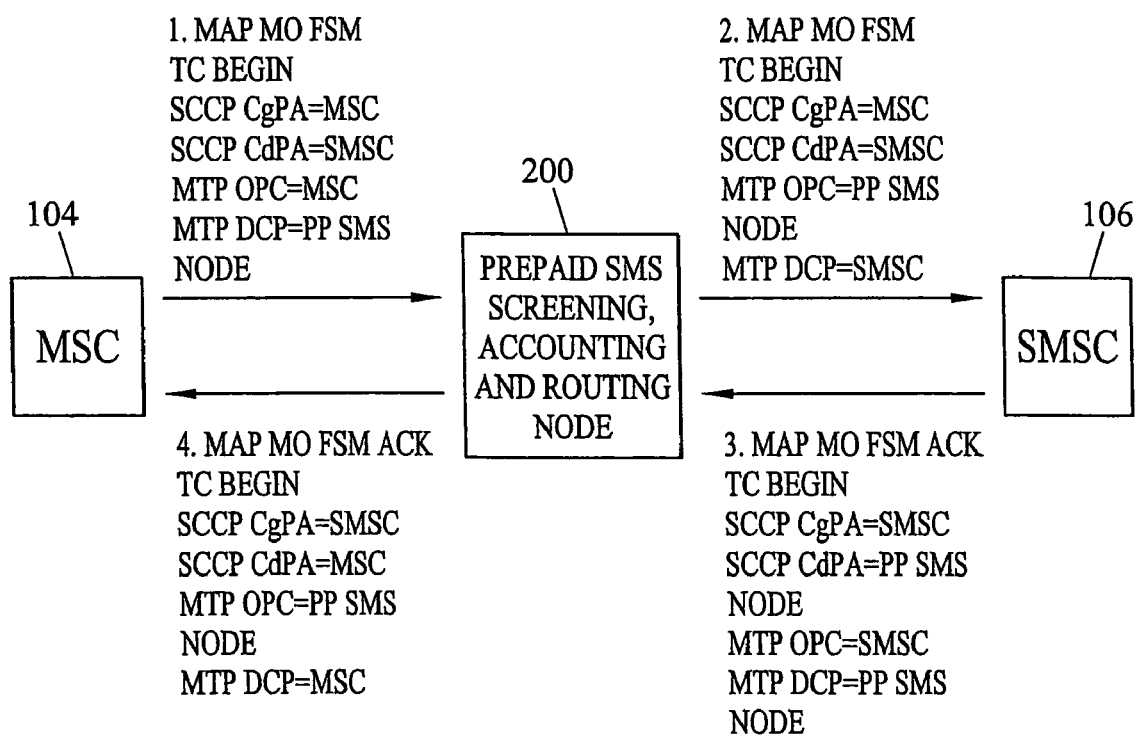
FIG. 3 is a message flow diagram illustrating exemplary operations performed by a prepaid screening, accounting, and routing node of the present invention in processing an SMS message originated by a prepaid subscriber where the prepaid subscriber has sufficient credit to forward the message.

FIG. 3 is a message flow diagram illustrating exemplary processing performed by prepaid SMS screening, accounting, and routing node 200 in processing an SMS message originating from a prepaid subscriber. Referring to FIG. 3, in step 1, MSC 104 sends a MAP mobile-originated forward short message message to prepaid SMS screening, accounting, and routing node 200. Prepaid SMS screening, accounting, and routing node 200 identifies the message as an SMS message and performs a lookup in prepaid SMS screening database 222 to determine whether the message is addressed to a prepaid subscriber. In response to determining that the message is directed to a prepaid subscriber, prepaid SMS screening, accounting, and routing node 200 performs a lookup in prepaid SMS accounting database 224. In this example, it is assumed that the subscriber has sufficient credit to send the SMS message. Prepaid SMS screening, accounting, and routing node 200 debits the subscriber's account for sending the SMS message. As mentioned above, the amount that the account is debited may depend on a variety of factors, such as the time of day, the size of the message, or the intended destination.

Because the SMS message passed the screening and because the prepaid subscriber had sufficient credit to send the message, in step 2, prepaid SMS screening, accounting, and routing node 200 sends a MAP mobile-originated forward short message message to SMSC 106. In step 3, SMSC 106 sends a MAP mobile-originated forward short message acknowledgement message to prepaid SMS screening, accounting, and routing node 200. In step 4, prepaid SMS screening, accounting, and routing node 200 forwards the acknowledgement message to MSC 104 ending the short message service transaction.

Figure 1:
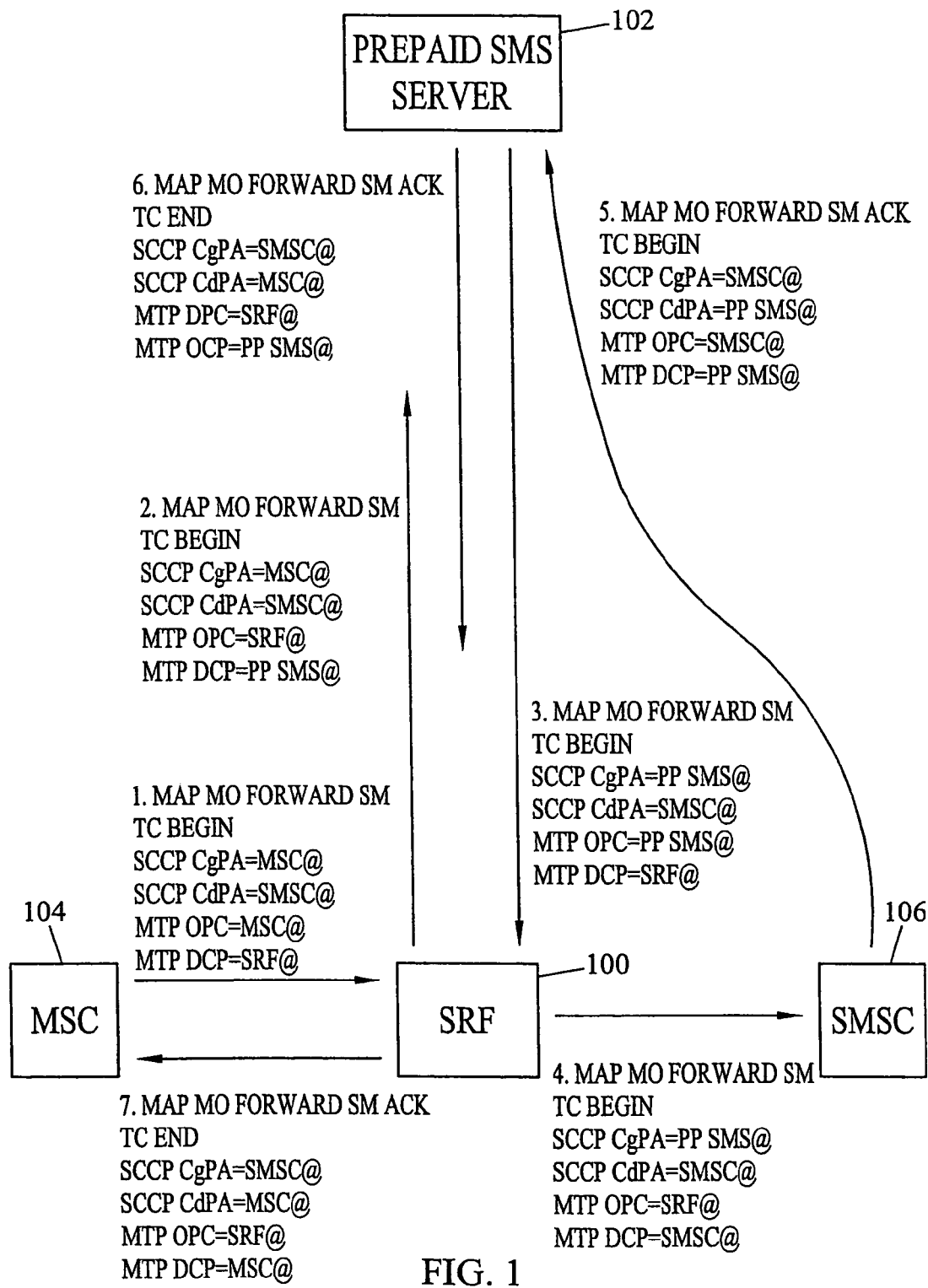
FIG. 1 is a block diagram of a conventional solution for providing prepaid SMS screening service.

The message flow illustrated in FIG. 3 can be contrasted with that illustrated in FIG. 1. In FIG. 3, only four MAP messages are required to screen, perform the accounting, and deliver the SMS message. In FIG. 1, a total of seven signaling messages are required. Accordingly, prepaid SMS screening, accounting, and routing node 200 according to the present invention greatly reduces SMS signaling message traffic in the network.

Figure 4:
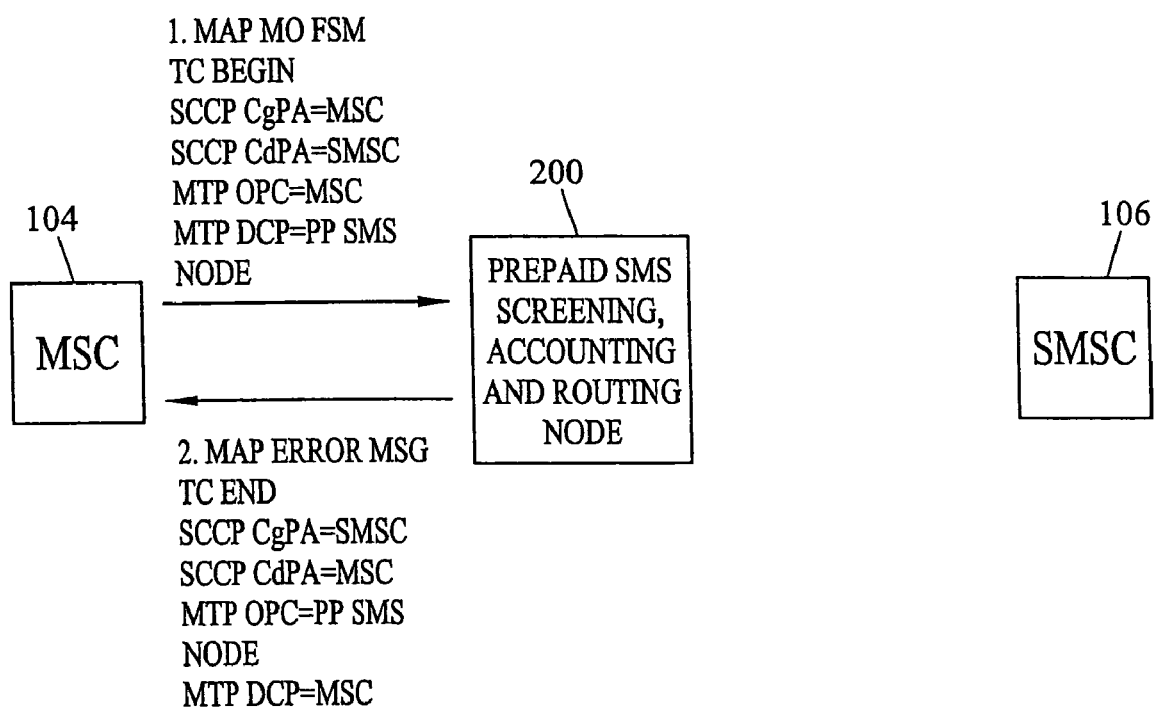
FIG. 4 is a message flow diagram illustrating exemplary processing performed by a prepaid SMS screening, accounting, and routing node according to the invention in blocking certain SMS messages.

FIG. 4 is a message flow diagram illustrating exemplary steps performed by prepaid SMS screening, accounting, and routing node 200 for the case where message is blocked, either because a prepaid subscriber lacks sufficient credit or because the prepaid subscriber has been ported from the network and is attempting to use the SMSC or his or her former network. Referring to FIG. 4, in step 1, MSC 104 sends a MAP mobile-originated forward short message message to prepaid SMS screening, accounting, and routing node 200. Prepaid SMS screening, accounting, and routing node 200 screens the message to determine whether the message is from a prepaid subscriber and whether the subscriber has been ported from the network and is trying to access the SMSC of his or her former network. In this example it is assumed that the message is blocked either because the subscriber lacks sufficient credit or the subscriber has been ported from the network and is trying to access the SMSC of his or her former network. Accordingly, in step ST2, prepaid SMS screening, accounting, and routing node 200 sends a MAP error message to MSC 104 indicating non-delivery of the SMS message. Thus, as illustrated in FIG. 1, prepaid SMS screening, accounting, and routing node 200 prevents unauthorized access to a subscriber's short message service center without unduly increasing traffic in the network. Only two messages are required to perform the blocking action. In prior art systems, such as that illustrated in FIG. 1, the SMS server would have to be queried in order to determine whether the subscriber had sufficient credit to send the message, resulting in increased signaling message traffic in the network.

Although FIGS. 3 and 4 illustrate message flow examples in which a message is addressed to prepaid SMS screening, accounting, and routing node 200, the present invention is not limited to such message flows. As will be described in detail below, a prepaid SMS screening, accounting, and routing node of the present invention is capable of intercepting prepaid SMS messages that are not addressed to it and performing screening and accounting for these messages as well.

Figure 5A:
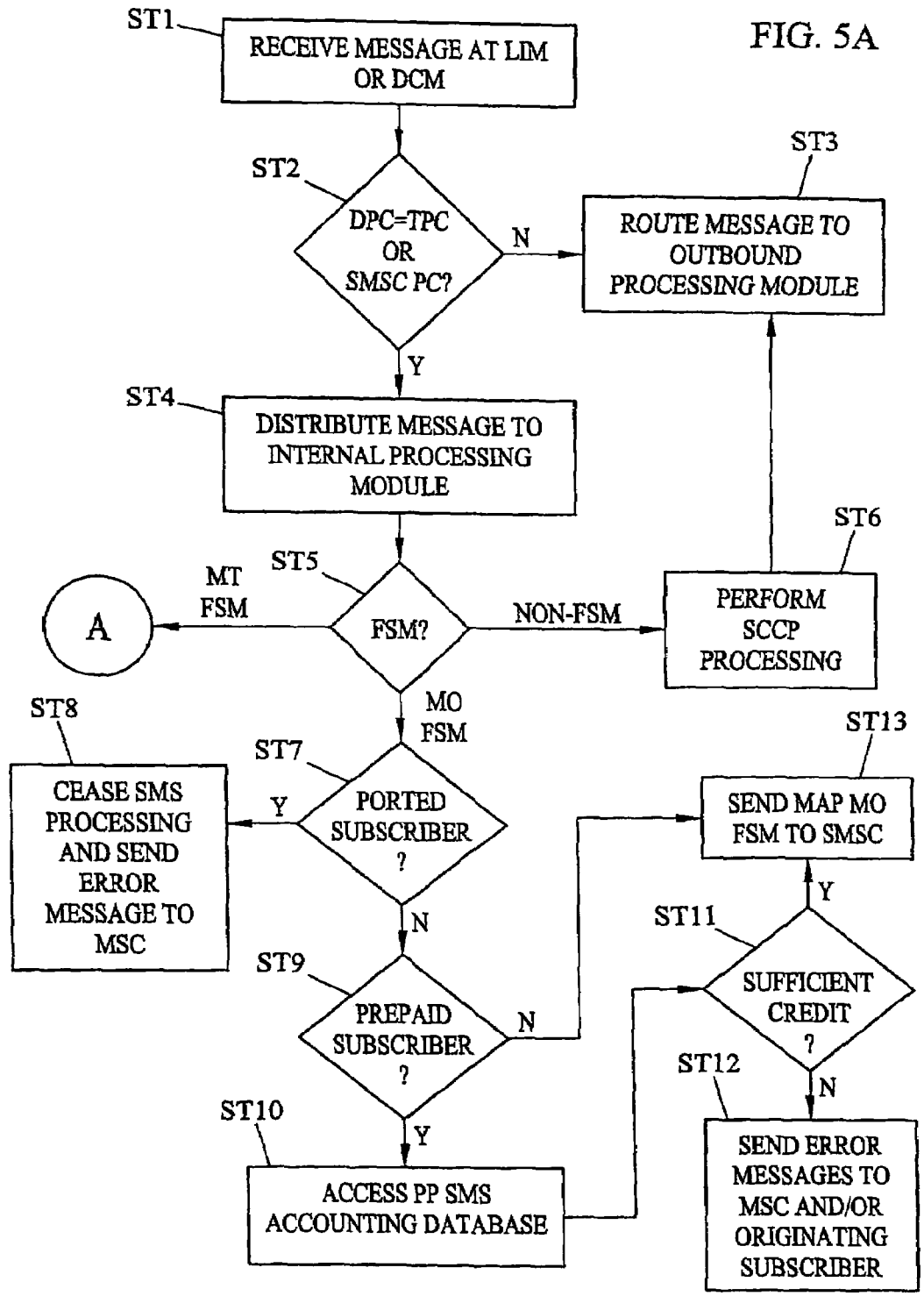
FIGS. 5A and 5B are a flow chart illustrating exemplary prepaid SMS processing steps that may be performed within a prepaid SMS screening, accounting, and routing node according to an embodiment of the present invention.
Figure 5B:
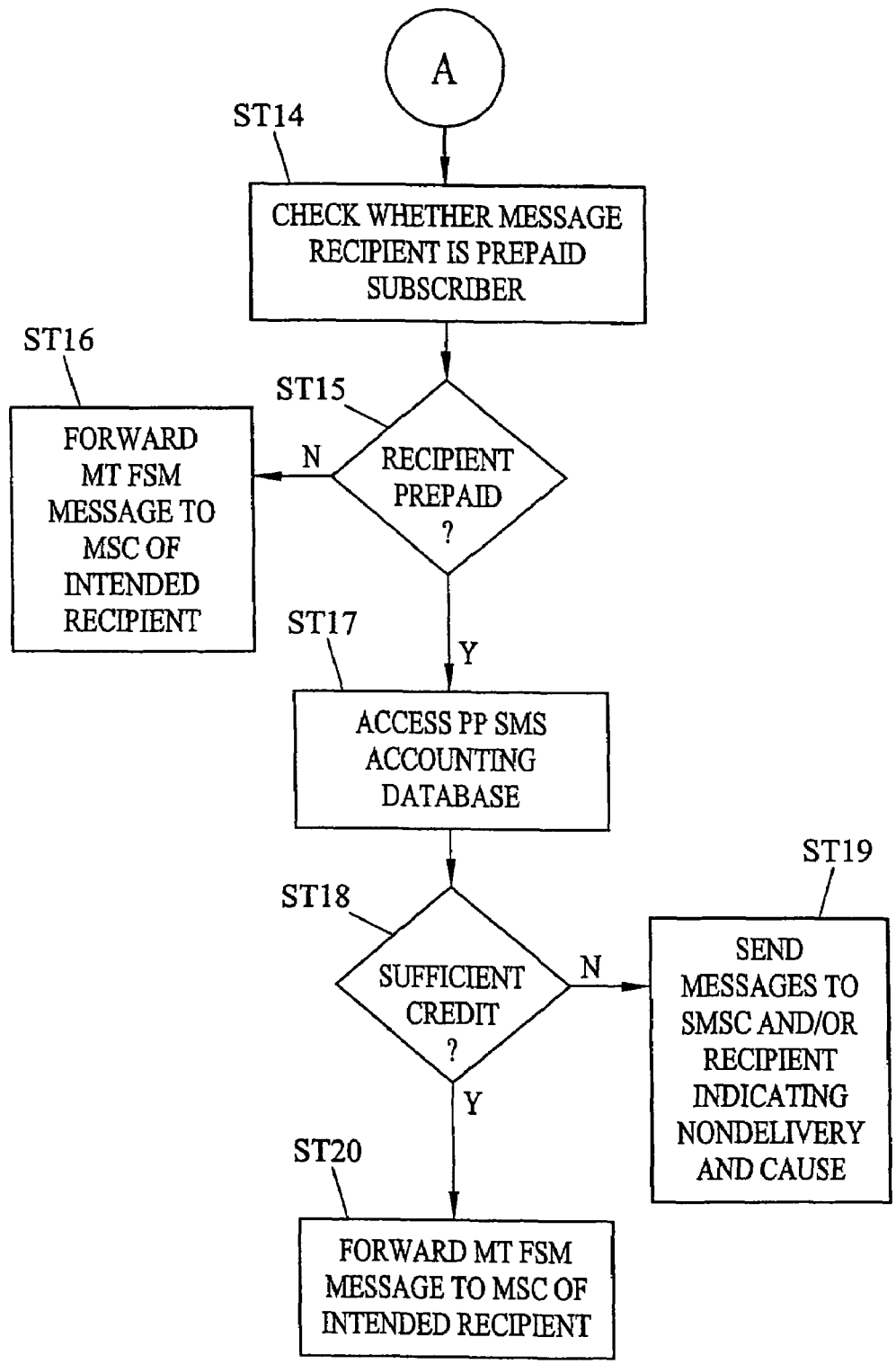

FIGS. 5A and 5B are a flow chart illustrating in detail exemplary processing steps performed by the various applications within prepaid SMS screening, accounting, and routing node 200 in processing received messages. Referring to FIG. 5A, in step ST1, prepaid SMS screening, accounting, and routing node 200 receives a message at LIM 202 or DCM 204. In this example, it is assumed that the message is received at LIM 202. In step ST2, prepaid SMS screening, accounting, and routing node 200 determines whether the destination point code in the message is equal to the true point code of prepaid SMS screening, accounting, and routing node 200 or to the point code of one of the SMSCs in the service provider's network. For the mobile-terminated case, discrimination function 210 may examine the OPC in the message to determine whether the message is from a predetermined list of SMSCs If the message is not addressed to one of these point codes, in step ST3, prepaid SMS screening, accounting, and routing node 200 routes the message to the processing module associated with the intended destination.

In step ST4, if the message contains one of the originating or destination point codes being screened for SMS service, distribution function 216 distributes the message to the appropriate internal processing module. Distribution function 216 may forward all messages having a signaling connection control part to prepaid SMS processing module 206 for prepaid SMS and SCCP processing. The message traverses IMT bus 208 and arrives at prepaid SMS processing module 206. In step ST5, prepaid SMS processing module 206 determines whether the message is a mobile-originated forward short message, a mobile-terminated forward short message message, or a non-FSM message. This step may be performed by looking at the mobile application part operation code in the message to determine MAP message type. If the message is determined to be a mobile-originated non-FSM message, control proceeds to step ST6 where normal SCCP processing is performed. Such processing may include global title translation. After this processing is performed, routing function 214 may route the message to its intended destination.

The terms "mobile-originated forward short message message" and "mobile-terminated forward short message message" and their associated abbreviations are intended to refer generally to any MAP messages associated with the delivery of a mobile-originated of mobile-terminated SMS message. Such MAP messages include MAP MO FSM and MT FSM messages for MAP implementations that have separate opcodes for these message types. In addition, these terms are intended to include FSM messages for earlier MAP implementations that do not have separate opcodes for MO FSM and MT FSM messages.

In step ST5, if the message is a MAP mobile-originated forward short message message, control proceeds to step ST7 where prepaid SMS screening application 218 determines whether the message originates from a ported out subscriber trying to access the SMSC of his or her former network. This step may be performed by examining the MSISDN parameter for the calling party stored in the MAP originating party address and the SMSC ID. If the message is determined to be from a ported out subscriber attempting to access an SMSC of his or her former network, in step ST8, prepaid SMS processing is ended and an error message is sent to the MSC indicating non-delivery of the message.

In step ST9, prepaid SMS screening application 218 determines whether the subscriber is a prepaid subscriber. In this step, prepaid SMS screening application 218 may perform a lookup in prepaid SMS screening database 222 using calling party information from the message. If the party is determined to be a prepaid subscriber, control proceeds to step ST10 where prepaid SMS accounting database 224 is accessed to determine whether the prepaid subscriber has sufficient credit to send the message. In step ST11, it is determined whether the subscriber has sufficient credit. If the subscriber does not have sufficient credit, the message is preferably not sent, and in step ST12, prepaid SMS screening, accounting, and routing node 200 sends a message to the MSC indicating that the subscriber lacks sufficient credit to send the message and/or sends an SMS message to the originating subscriber indicating non-delivery of the SMS message and the reason for non-delivery.

In step ST13, if the subscriber has sufficient credit, prepaid SMS screening, accounting, and routing node 200 forwards the message to the short message service center for delivery to the destination subscriber. This may include sending the message to the appropriate outbound card and over the network. If the network is an IP network, the message may be encapsulated in an IP packet including appropriate transport adapter layers. Thus, as illustrated in FIGS. 5A and 5B, all of the steps required to perform prepaid SMS processing are performed within a single prepaid SMS screening, accounting, and routing node. This reduces the message traffic in a service provider's network.

As stated above, prepaid SMS screening, accounting, and routing node 200 may also screen for prepaid terminating subscribers. Returning to step ST5 in FIG. 5A, if it is determined that the message is a mobile-terminated forward short message message, control proceeds to FIG. 5B where prepaid SMS processing for mobile-terminated SMS messages is performed. Prior to entering FIG. 5B, a test may be performed to determine whether the mobile-terminated SMS message originates from a predetermined list of SMSCs for which the recipient pays to receive SMS messages. Examples of such special SMS messages include SMS messages containing sports scores, stock quotes, news, etc. Alternatively, the recipient may simply agree to prepay for all incoming SMS messages, in which the initial check would be unnecessary.

Referring to steps ST14 and ST15 in FIG. 5B, prepaid SMS screening application 218 determines whether the recipient is a prepaid subscriber. If the recipient is not prepaid, control proceeds to step ST16 where prepaid SMS screening, accounting, and routing node 200 forwards the MT FSM message to the MSC of the intended recipient.

In steps ST17 and ST18, if the recipient is a prepaid subscriber, prepaid SMS accounting application 220 accesses the prepaid SMS accounting database to determine whether the recipient has sufficient credit to receive the message. If the recipient does not have sufficient credit to receive the SMS message, control proceeds to step ST19 where prepaid SMS screening, accounting, and routing node 200 sends messages to the originating SMSC and/or to the recipient indicating non-delivery of the SMS message and the reason for non-delivery. If the intended recipient has sufficient credit to receive the SMS message, control proceeds to step ST19 where the MT FSM message is forwarded to the MSC of the intended recipient. The MSC then delivers the SMS message to the intended recipient.

Because prepaid SMS screening and accounting functions are performed triggerlessly based on SMS messages received by a prepaid SMS screening, accounting, and routing node, the need for IN queries for prepaid SMS screening and accounting is eliminated. In addition, because SMS screening is performed before accessing the prepaid SMS accounting database, unnecessary accesses to the prepaid SMS accounting database are also eliminated. However, the present invention is not limited to performing prepaid SMS screening prior to accessing the prepaid SMS accounting database. For example, a network service provider may provide only prepaid SMS service. In such a situation, prepaid SMS screening is unnecessary and could be eliminated without departing from the scope of the invention. Even in networks with both prepaid and postpaid subscribers, the prepaid SMS screening function may be eliminated, and the accounting database may be accessed for both prepaid SMS and postpaid SMS subscribers. In such an embodiment, the present invention still provides a significant advantage over prior art solutions by intercepting SMS messages that are not addressed to a specialized screening node or accounting database and eliminating the need for IN queries.

In yet another embodiment of the invention, prepaid SMS accounting database 224 may include entries for both prepaid and postpaid subscribers. For prepaid subscribers, the entries may store the amount of credit that the subscribers have, as described above. For postpaid subscribers, database 224 may create an SMS transaction record for each SMS message sent to or from a particular subscriber. Such a record may include source and destination information, the length of the message, and the time of day that the message was sent. The SMS transaction records may be forwarded to a billing application and used to generate bills for postpaid subscribers.

It will be understood that various details of the invention may be changed without departing from the scope of the invention. Furthermore, the foregoing description is for the purpose of illustration only, and not for the purpose of limitation—the invention being defined by the claims.

What is claimed is:

1. A prepaid SMS screening and accounting module comprising:
    (a) a prepaid SMS screening component comprising a first application program for receiving SMS messages and determining whether the SMS messages are associated with prepaid subscribers;
    (b) a prepaid SMS accounting component comprising a second application program co-located with the prepaid SMS screening component for determining, for the prepaid SMS messages associated with prepaid subscribers, whether the subscribers have sufficient credit for delivery of the SMS messages, and, in response, for sending the SMS messages to their intended destinations; and
    (c) at least one processor for executing the first and second application programs within the prepaid SMS screening and accounting components.

2. The prepaid SMS screening and accounting module of claim 1 wherein the prepaid SMS screening component is adapted to determine whether SMS messages originate from ported-out subscribers attempting to access SMSCs of their former networks, and, in response, for discarding the SMS messages.

3. The prepaid SMS screening and accounting module of claim 1 wherein the prepaid SMS accounting component is adapted to debit prepaid subscriber accounts in response to sending the SMS messages.

4. The prepaid SMS screening and accounting module of claim 1 wherein the prepaid SMS accounting component is adapted to debit the subscriber accounts based on the time of day that SMS messages are sent.

5. The prepaid SMS screening and accounting module of claim 1 wherein the prepaid SMS accounting component is adapted to debit the subscriber accounts based on the sizes of the SMS messages.

6. The prepaid SMS screening and accounting module of claim 1 comprising a prepaid SMS screening database co-located with the prepaid SMS screening component for storing information for identifying prepaid SMS subscribers.

7. The prepaid SMS screening and accounting module of claim 1 comprising a prepaid SMS accounting database co-located with the prepaid SMS accounting component for storing account information for prepaid SMS subscribers.

8. The prepaid SMS screening and accounting module of claim 1 comprising a prepaid SMS screening and accounting database co-located with the prepaid SMS screening and accounting components for storing information for identifying prepaid SMS subscribers and account information for the prepaid SMS subscribers.

9. A prepaid SMS accounting and routing module comprising:
    (a) an SMS accounting database for storing subscriber records for prepaid and post-paid SMS subscribers;
    (b) an SMS accounting component comprising a first application program operatively associated with the SMS accounting database for accessing the subscriber records in response to received SMS messages to determine whether prepaid subscribers have sufficient credit for delivery of SMS messages and to record SMS transaction information for prepaid and post-paid subscribers;
    (c) a routing component comprising a second application program operatively associated with the SMS accounting component for routing SMS messages for prepaid subscribers with sufficient credit and SMS messages for post-paid subscribers to destination nodes; and
    (d) at least one processor for executing the first and second application programs within the SMS accounting and routing components.

* * * * *